United States Patent Office 3,242,198
Patented Mar. 22, 1966

3,242,198
STEROID 17β-YL ACETALS
Alberto Ercoli, Milan, and Rinaldo Gardi, Carate Brianza, Milan, Italy, assignors to Francesco Vismara S.p.A., Como, Italy
No Drawing. Filed Feb. 26, 1963, Ser. No. 261,201
Claims priority, application Italy, Feb. 28, 1962, 4,037/62
17 Claims. (Cl. 260—397.4)

This invention relates to steroid 17β-yl acetals and more precisely, to mixed acetals of aliphatic and cycloaliphatic ketones with 17β-hydroxy steroids of the androstane series and to a process for their preparation.

The new compounds of this invention may be represented by the following structural formulas:

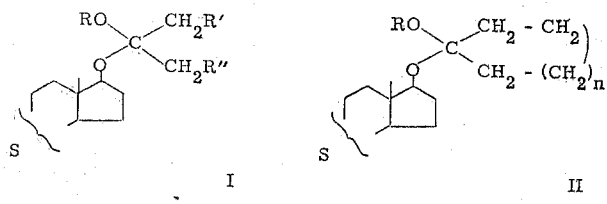

where R is a lower alkyl from 1 to 3 carbon atoms, preferably methyl or ethyl; R' and R" each represent hydrogen, methyl or ethyl; $n$ is one of the integers 1 and 2 and S represents one of the following groups:

(a)

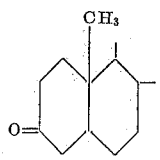

and $\Delta^1,\Delta^4,\Delta^{1,4},\Delta^{4,6}$-dehydro analogs thereof, the 11β-ol-derivatives of the $\Delta^4$-dehydro analogs and the 11-one derivatives of the $\Delta^4$-dehydro analogs, (b)

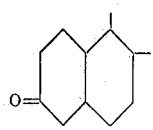

and $\Delta^4,\Delta^{5(10)}$, $\Delta^{5(6)}$-dehydro analogs thereof, (c)

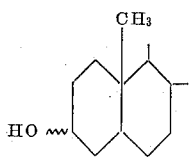

and $\Delta^1,\Delta^4,\Delta^{1,4},\Delta^{5(6)}$-dehydro analogs thereof, and lower alkyl ethers and lowers alkanoyl esters of said compounds having the grouping (c) and the dehydro analogs thereof, (d)

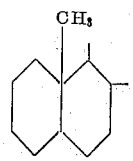

and $\Delta^2,\Delta^4,\Delta^{3,5}$-dehydro analogs thereof, and 19-nor-$\Delta^4$-dehydro analog thereof.

The term "lower alkyl" as used herein includes saturated lower hydrocarbon radicals containing from 1 to 5 carbon atoms, inclusive, preferably methyl, ethyl, propyl, isopropyl, amyl and cyclopentyl. The term "lower alkanoyl" means the acyl residue of an alkanoic acid containing from 1 to 3 carbon atoms, inclusive.

The new steroid 17β-yl acetals of this invention, also named 17-(1'-lower alkoxy)-alkyl or cycloalkyl ethers of 17β-hydroxy steroids, are useful because of their hormonal properties, particularly androgenic and/or anabolic properties. Of particular value are the compounds corresponding to the formula II above, that is the cyclopentanone and cyclohexanone steroid 17β-yl acetals, which besides possessing enhanced androgenic and/or anabolic activity over the parent 17β-hydroxy steroids are also useful as intermediates for the preparation of the corresponding 17-cycloalkenyl ethers disclosed in our copending application Serial No. 184,680, filed on April 3, 1962, now Patent No. 3,185,744. The process of converting the cyclopentanone or cyclohexanone steroid 17β-yl acetals of this invention into the corresponding 17β-cycloalkenyl ethers consists in melting the above compounds in the presence of a small amount of an organic base such as quinoline, piperidine, collidine and in recovering from the mixture the resulting 17-cycloalkenyl ether by dissolution in an appropriate organic solvent.

The important androgenic and/or anabolic activity of the steroid 17β-yl acetals is illustrated in the Table I which summarizes the results of pharmacological testing obtained with representative compounds of this invention orally administered for 7 days to immature castrated albino rats according to Hershberger (Proceedings of the Society for Experimental Biology and Medicine, 83, 175; 1953).

TABLE I

| No. | Compounds | A Androgenic potency | B Anabolic potency | B/A |
|---|---|---|---|---|
| 1 | 17α-methyltestosterone | 1 | 1 | 1 |
| 2 | 17-(1'-methoxy)-cyclopentyl ether of 5α-androstane 17β-ol-3-one | 2.2 | 2.7 | |
| 3 | 17-(1'-methoxy)-cyclohexyl ether of 5α-androstane-17β-ol-3-one | 1 | 2 | 2.0 |
| 4 | 17-(1'-methoxy)-cyclopentyl ether of testosterone | 1.5 | 2.7 | |
| 5 | 17-(1'-ethoxy)-cyclopentyl ether of testosterone | 1.2 | 2.7 | 2.25 |
| 6 | 17-(1'-methoxy)-cyclohexyl ether of testosterone | 0.8 | 1.6 | 2.0 |
| 7 | 17-(1'-ethoxy)-cyclohexyl ether of testosterone | 1.1 | 2.5 | 2.36 |
| 8 | 17-(1'-methoxy)-1'-methyl)-ethyl ether of testosterone | 0.8 | 1.7 | 2.12 |
| 9 | 17-(1'-ethoxy-1'-methyl)-ethyl ether of testosterone | 0.9 | 1.6 | |
| 10 | 17-(1'-methoxy)-1'-methyl)-n. propyl ether of testosterone | 0.9 | 1.7 | |
| 11 | 17-(1'-methoxy)-cyclopentyl ether of Δ¹-5α-androstene-17β-ol-3-one | 2.5 | 7.9 | 3.16 |
| 12 | 17-(1'-methoxy)-cyclohexyl ether of Δ¹-5Δ-androstene-17β-ol-3-one | 3.3 | 7.6 | 2.30 |
| 13 | 17-(1'-methoxy)-cyclopentyl ether of Δ⁴-androstene-3β,17β-diol | 2.0 | 2.0 | |
| 14 | 17-(1'-methoxy)-cyclopentyl ether of Δ⁴-androstene-3β,17β-diol-3-acetate | 2.0 | 2.8 | |
| 15 | 17-(1'-methoxy)-cyclopentyl ether of Δ⁴-androstene-3β,17β-diol-3-propionate | 2.0 | 2.4 | |
| 16 | 17-(1'-ethoxy)-cyclopentyl ether of Δ⁴-androstene-3β,17β-diol | 1.7 | 1.7 | |
| 17 | 17-(1'-methoxy)-cyclohexyl ether of Δ⁴-androstene-3β,17β-diol | 1.5 | 1.7 | |
| 18 | 17-(1'-methoxy)-cyclohexyl ether of Δ⁴-androstene-3β,17β-diol-3-acetate | 1.5 | 1.4 | |
| 19 | 17-(1'-methoxy)-cyclohexyl ether of Δ⁴-androstene-3β,17β-diol-3-propionate | 1.1 | 1.7 | |
| 20 | 17-(1'-methoxy)-cyclohexyl ether of Δ¹-5α-androstene-3β,17β-diol | 1.8 | 3.4 | |
| 21 | 17-(1'-methoxy)-1'-methyl)-ethyl ether of 5α-androstane-3α,17β-diol-3-acetate | 1.2 | 1.3 | |
| 22 | 17-(1'-methoxy)-cyclohexyl ether of Δ²-5α-androstene-17β-ol | 0.4 | 1.6 | 4 |
| 23 | 17-(1'-methoxy)-cyclohexyl ether of 19-nortestosterone | 0.6 | 1.8 | 3 |
| 24 | 17-(1'-methoxy)-cyclopentyl ether of 5α-androstane-3β,17β-diol-3-acetate | 0.6 | 1.2 | 2 |

The androgenic and anabolic potencies of each compound have been determined by the ratio: doses of methyltestosterone/doses of the tested compound, said doses being those necessary to obtain a standard increase in the weight of seminal vesicles (as index of androgenic activity) and a standard increase in the weight of levator ani (as index of anabolic activity) over the controls.

From the data reported in the table it appears that many steroid 17β-yl acetals display an androgenic and anabolic activity higher than methyltestosterone, though lacking in the methyl group at the 17α-position which, as it is well known, has the property of raising the hormonal activity of the 17β-hydroxy steroids especially when orally administered.

Other compounds of the table exhibit a greater anabolic activity with a weak androgenic activity. Because of this favorable ratio between anabolic and androgenic activity these compounds can be usefully employed as anabolic agents.

Besides the new steroid 17β-yl acetals of this invention are of greater value as androgenic and/or anabolic agents as compared with methyltestosterone because the non-physiologically active methyl group is not present in the 17-position.

Preferred compounds of this invention are:

17-(1'-methoxy)-cyclohexyl ether of Δ²-5α-androstene-17β-ol;
17-(1'-methoxy)-cyclohexyl ether of 19-nortestosterone;
17-(1'-methoxy)-cyclohexyl ether of Δ¹-5α-androstene-17β-ol-3-one;
17-(1'-methoxy)-cyclohexyl ether of Δ¹-5α-androstene-3β,17β-diol;
17-(1'-methoxy)-cyclopentyl ether of 5α-androstane-3β,17β-diol-3-acetate;
17-(1'-methoxy)-cyclopentyl ether of 5α-androstane-17β-ol-3-one;
17-(1'-methoxy)-cyclopentyl ether of testosterone;
17-(1'-methoxy)-cyclopentyl ether of Δ¹-5α-androstene-17β-ol-3-one;
17-(1'-methoxy)-cyclopentyl ether of Δ⁴-androstene-3β,17β-diol;
17-(1'-methoxy)-cyclopentyl ether of Δ¹,⁴-androstadiene-17β-ol-3-one;
17-(1'-methoxy)-cyclopentyl ether of Δ⁴-androstene-3β,17β-diol-3-propionate;
17-(1'-ethoxy)-cyclopentyl ether of testosterone;
17-(1'-ethoxy)cyclohexyl ether of testosterone.

The new (1'-alkoxy)-alkyl and cycloalkyl ethers of this invention are obtained by reacting at a temperature lower than 70° C. the corresponding 17β-hydroxy steroid of and androstane series with a functional derivative of an aliphatic or cycloaliphatic ketone having the formulas:

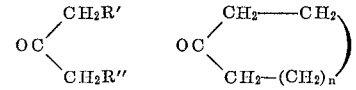

where R', R'' and $n$ are as defined above, the 3-hydroxy group, if present, being protected.

The term "functional derivative" means the typical derivatives of the ketones with aliphatic alcohols, that is acetals, enolethers, preferably dimethyl or diethyl acetals, methyl or ethyl enolethers or a mixture of these derivatives.

A suitable functional derivative is a mixture of a diethyl acetal and an ethyl enolether prepared by heating the aliphatic or cycloaliphatic ketone with ethyl orthoformate and ethyl alcohol in the presence of an acid catalyst such as p-toluenesulphonic acid.

The reaction between the functional derivative of the aliphatic or cycloaliphatic ketone and the 17-hydroxy steroid is performed at a temperature in the range of from about 0 to about 70° C., preferably at room temperature (10–30° C.), in the presence of a suitable organic solvent and an acid catalyst. The acid catalyst is preferably a salt of a strong organic acid or a salt of a strong acid with an organic base, for example p-toluenesulphonic acid, benzenesulphonic acid, pyridine hydrochloride, pyridine p-toluenesulphonate and the like.

Suitable solvents are: methylene chloride, chloroform, petroleum ether, hexane, diethyl ether, t.butyl alcohol or mixtures thereof.

The desired steroid 17β-yl acetal is obtained after eliminating the solvent, removing the excess of the ketone functional derivative reactant under reduced pressure and purifying the residue by successive crystallizations in the usual manner.

If the resulting steroid derivative contains a keto group in the 3-position, it can be submitted, if desired, to a further step in order to transform the 3-keto group into a hydroxy group by normal reduction methods, for instance, by treatment with lithium aluminum hydride or sodium borohydride.

Alternatively, the 17-(1'-methoxy)-alkyl and cycloakyl ethers of 3,17β-dihydroxy androstanes can be obtained by reacting a 3-lower alkanoyl ester of the 3,17β-dihydroxy steroid with the functional derivative of the desired ketone under the conditions above mentioned. The ester group at the 3-position can be hydrolized in an alkaline medium under which conditions the ether group at the 17-position is stable, thus providing the 17-(1'-methoxy)-alkyl or cycloalkyl ether of the 3,17β-dihydroxy steroid.

The 3-alkoxy-17β-steroidyl acetals, can be obtained by methods already known in the art starting from a 3-hydroxy-17-keto androstane derivative, by first etherifying the hydroxy group at the 3-position with an alkyl halide, then reducing the 17-keto group into a hydroxy group by treatment with reducing agent (lithium aluminum hydride or sodium borohydride) and reacting the 17β-hydroxy derivative with a functional derivative of the acyclic or cyclic ketone according to the method of this invention.

The following examples are set forth as illustrating in detail the materials and methods for the preparation of the new compounds but they are not to be regarded as limiting the invention.

Example 1

3 g. of androstan-17β-ol-3-one are dissolved in 100 cc. of chloroform and 800 cc. of hexane and treated with 5 mg. of p-toluenesulfonic acid and 5 cc. of cyclopentanone diethyl acetal (obtained by treating cyclopentanone with orthoformic ether and dry ethanol according to the method described in Rec. Trav. Chim. Pays Bas 57, 136; 1938). The resulting mixture is distilled for about 30 minutes, then the distallation is completed under vacuum and the residue chromatographed on alumina and recrystallized from ether-ethanol, to give 17-(1'-ethoxy)-cyclopentyl ether of androstanolone, M.P. 101–103° C.; $[\alpha]_D = +25°$ (dioxane).

Example 2

A suspension of 10 g. of androstanolone in 50 cc. of anhydrous dioxane is treated at room temperature and under stirring with 100 mg. of pyridine p-toluenesulfonate and 5 cc. of cyclohexanone methyl enolether (prepared by reacting the cyclohexanone dimethyl acetal with benzoyl chloride and quinoline as described by Weiland Garbsch Ber. 59, 1175; 1926). Androstanolone goes rapidly into solution and after a few minutes a new product begins to precipitate. After standing overnight the residue is taken up with methanol, filtered and recrystallized from methanol-methylene chloride to obtain 9.2 g. of a crude product melting at 170–173° C. which, by further purification, gives 17-(1'-methoxy)-cyclohexyl ether of androstanolone, M.P. 177–178° C.; $[\alpha]_D = +28.5°$ (dioxane).

Example 3

To 100 cc. of cyclopentanone, 150 cc. of methanol and 1 g. of p-toluenesulfonic acid there is added, little by little and under stirring, 150 cc. of methyl orthoformate. The resulting mixture is refluxed for about 45 minutes, then cooled and treated with 760 mg. of potassium carbonate. After filtration and rectification the fraction boiling at 139–141° C. is collected and 113 cc. of cyclopentanone dimethyl acetal are obtained.

By treating 2 g. of androstanolone in 80 cc. of chloroform and 600 cc. of hexane with 5 mg. of p-toluenesulfonic acid and 3 cc. of cyclopentanone dimethyl acetal as in Example 1, 17-(1'-methoxy)-cyclopentyl ether of androstanolone is obtained, M.P. 176–178° C; $[\alpha]_D = +21.5° \pm 0.5$ (dioxane). This compound is heated on oil bath at 190–200° C. for 70 minutes, in the presence of a drop of quinoline. The residue is taken up with methanol, filtered and crystallized from methanol to produce the 17-cyclopentenyl ether of androstanolone, M.P. 98–102° C. undepressed in mixture with an authentic sample obtained in another manner.

Example 4

A solution of 1 g. of testosterone in 10 cc. of anhydrous dioxane is treated at room temperature with 10 mg. of pyridine p-toluenesulfonate and 1 cc. of cyclohexanone methyl enolether. After 10 minutes a crystalline product precipitates which, after standing overnight, is taken up with methanol, then filtered and recrystallized from methanol-methylene chloride to give 1.1 g. of 17-(1'-methoxy)-cyclohexyl ether of testosterone, M.P. 200–207° C.

By further crystallizations from methanol-methylene chloride the melting point raises to 209–211° C.; $[\alpha]_D = +78.5° \pm 0.5$ (dioxane).

Example 5

250 cc. of cyclopentanone dimethyl acetal are treated with 1 g. of p-toluenesulfonic acid and heated in a flask equipped with a Vigreux column and condensers. The methanol is distilled off for about 2 hours, after which the residue is fractionated to obtain 150 g. of cyclopentanone methyl enolether, B.P. 115–120° C.

5 g. of testosterone suspended in 25 cc. of t. butyl alcohol are treated with 50 mg. of pyridine p-toluenesulfonate and 3 cc. of cyclopentanone methyl enolether following the procedure of Example 4, to obtain 17-(1'-methoxy)-cyclopentyl ether of testosterone. The product purified from methanol-methylene chloride, shows M.P. 186–188° C.; $[\alpha]_D = +78°$ (dioxane).

Example 6

250 cc. of cyclopentanone diethyl acetal are treated with 1 g. of p-toluenesulfonic acid and heated in a flask equipped with a Vigreux column and condensers to eliminate ethanol. After two hours the residue is fractionated and 150 g. of cyclopentanone ethyl enolether are collected. B.P. 130–135° C.

5 cc. of the product so obtained are added to 3 g. of testosterone dissolved in 200 cc. of methylene chloride and 600 cc. of petroleum ether in the presence of 5 mg. of pyridine tosylate. Distillation is carried out for 30 minutes then, after neutralization with methanolic potassium hydroxide, the solvent is evaporated under vacuum. The residue, recrystallized from methanol, gives 1.3 g. of 17-(1'-ethoxy)-cyclopentyl ether of testosterone, M.P. 152–154° C.; $[\alpha]_D = +79° \pm 0.5$ (dioxane). Similarly, 17-(1'-ethoxy)-cyclohexyl ether of testosterone is prepared by treating testosterone with cyclohexanone diethyl acetal, M.P. 137–139° C.; $[\alpha]_D = +80° \pm 1$ (dioxane).

Example 7

2 g. of testosterone are dissolved in 600 cc. of hexane and the resulting solution is treated with 10 cc. of acetone dimethyl acetal and 10 mg. of pyridine tosylate. Distillation under vacuum and crystallization of the residue from methanol-methylene chloride provides 17-(1'-methyl-1'-methoxy)-ethyl ether of testosterone, M.P. 159–161° C.; $[\alpha]_D = +91.5° \pm 1$ (dioxane).

By substituting acetone diethyl acetal for acetone dimethyl acetal in the above reaction, 17-(1'-methyl-1'-ethoxy)-ethyl ether of testosterone is obtained. The product recrystalized from ethanol-ethylene chloride shows M.P. 133–135° C.; $[\alpha]_D = +89.5° \pm 1$ (dioxane).

Example 8

To 88.5 g. of quinoline and 96.5 g. of phosphoric anhydride there are added 82 g. of methyl ethyl ketone dimethyl acetal. The mixture is gradually heated on oil bath from 110° to 180° C. and the distillation temperature is maintained at the column head at 65–70° C. The distillate is collected, treated with metallic sodium to destroy the methanol, washed with water, dried over potassium carbonate and, finally rectified. Yield 34 g. of methyl enolether of methyl ethyl ketone, B.P. 65–67° C.

2 g. of testosterone in 4 cc. of t. butyl alcohol are treated with 2 cc. of methyl enolether of methyl ethyl ketone and 10 mg. of pyridine tosylate, as in Example 5 to give 17-(1'-methyl-1'-methoxy)-propyl ether of testosterone, M.P. 142–145° C.; $[\alpha]_D = +86° \pm 1$ (dioxane).

Example 9

A suspension of 10 g. of $\Delta^{1,4}$-androstadiene-17β-ol-3-one in 15 cc. of t. butyl alcohol is treated under stirring with 100 mg. of pyridine p-toluenesulfonate and 5 cc. of cyclohexanone methyl enolether. After standing overnight the precipitate is taken up with methanol and recrystallized from methylene chloride-methanol to obtain 17-(1'-methoxy)-cyclohexyl ether of $\Delta^{1,4}$-androstadiene-17β-ol-3-one, M.P. 140–142° C.; $[\alpha]_D = +39.6°$ (dioxane).

In the same manner as above, starting from $\Delta^{4,6}$-androstadiene-17β-ol-3-one, the 17 - (1' - methoxy)-cyclohexyl ether of $\Delta^{4,6}$-androstadiene-17β-ol-3-one is obtained, M.P. 202–204° C.; $[\alpha]_D = +29.5°$ (dioxane).

Example 10

According to the technique decribed in Example 9, 5 g. of $\Delta^{1,4}$-androstadiene-17β-ol-3-one in 10 cc. of t. butyl alcohol are treated with 100 mg. of pyridine p-toluenesulfonate and 5 cc. of cyclopentanone methyl enolether, to give 17-(1'-methoxy)-cyclopentyl ether of $\Delta^{1,4}$-androstadiene-17β-ol-3-one. By heating this compound on an oil bath at 190–200° C. for 70 minutes in the presence of a drop of pyridine, a residue is obtained which is taken up with methanol, filtered and crystallized from methanol to give the 17-cyclopentenyl ether of $\Delta^{1,4}$-androstadiene-17β-ol-3-one, M.P. 132–134° C. undepressed in mixture with an authentic sample obtained in another manner.

Example 11

2 g. of 17-(1'-ethoxy)-cyclopentyl ether of testosterone, obtained as described in Example 6, are dissolved in 150 cc. of ether and the solution refluxed for 1 hour with 3 g. of lithium aluminum hydride in 40 cc. of anhydrous ether. After careful addition of water, the mixture is extracted with ether and the ethereal extracts collected and dried over anhydrous sodium sulfate. Evaporation of the solvent gives a solid residue which crystallized from a mixture of methylene-chloride-methanol consists of 17-(1'-ethoxy)-cyclopentyl ether of $\Delta^4$ - androstene-3β,17β-diol, M.P. 86–88° C.; $[\alpha]_D = +32°$ (dioxane).

Analogously, 17-(1'-methoxy)-cyclohexyl ether of $\Delta^1$-testosterone, prepared according to the Example 9, is converted by treatment with lithium aluminum hydride to 17-(1'-methoxy)-cyclohexyl ether of $\Delta^{1,4}$-androstadiene-3β,17β-diol.

Example 12

8 g. of 5α-androst-2-ene-17β-ol in 50 cc. of anhydrous dioxane are treated as in Example 2 and 5 cc. of cyclohexanone methyl enolether in the presence of 100 mg. of pyridine p-toluenesulfonate to give 17-(1'-methoxy)-cyclohexyl ether of 5α-androst-2-ene-17β-ol, M.P. 166–168° C.

By substituting 5α-androstane-17β-ol for 5α-androst-2-ene-17β-ol in the above reaction, the 17-(1'-methoxy)-cyclohexyl ether of 5α-androstane-17β-ol is obtained.

Similarly, 17-(1'-methoxy)-cyclohexyl ether of $\Delta^{3,5}$-androstadiene-17β-ol and 17 - (1' - methoxy) - cyclohexyl ether of 19-norandrost-4-ene-17β-ol are prepared.

Example 13

2 g. of 5α-androst-1-ene-17β-ol-3-one in 4 cc. of t. butyl alcohol are treated at room temperature with 20 mg. of pyridine p-toluenesulfonate and 1 cc. of cyclopentanone methyl enolether. The mixture is allowed to stand overnight, after which the product which separates of is taken up with methanol, filtered and recrystallized from methanol to give 17-(1'-methoxy)-cyclopentyl ether of 5α-androst-1-ene - 17β - ol - 3-one, M.P. 129–131° C.; $[\alpha]_D = +42.5°$ (dioxane).

A solution of 1 g. of sodium borohydride in 50 cc. of water is added dropwise over 30 minutes to a stirred solution of 5 g. of 17-(1'-methoxy)-cyclopentyl ether of 5α-androst-1-ene-17β-ol-3-one in 200 cc. of dimethylformamide and maintained at a temperature of 20° C. The mixture is then diluted with water and extracted with ether. The product obtained by evaporation of the ethereal extract is purified from methanol to give 17-(1'-methoxy)-cyclopentyl ether of 5α-androst-1-ene-3β,17β-diol.

By substituting cyclohexanone methyl enolether for cyclopentanone methyl enolether and operating as above, the 17-(1'-methoxy)-cyclohexyl ether of 5α-androst-1-ene-17β-ol-3-one is prepared, M.P. 139–141° C.;

$$[\alpha]_D = +49° \pm 1$$

(dioxane) and converted, by reduction with sodium borohydride, to 17 - (1' - methoxy) - cyclohexyl ether of 5α-androst-1-ene-3β,17β-diol.

Example 14

A suspension of 8 g. of $\Delta^4$-androstene-3β,17β-diol-3-acetate in 50 cc. of anhydrous dioxane is treated at room temperature and under stirring with 5 cc. of cyclopentanone methyl enolether in the presence of 100 mg. of pyridine p-toluenesulfonate. The mixture worked as in Example 4 furnishes 17-(1'-methoxy)-cyclopentyl ether of $\Delta^4$-androstene-3β,17β-diol-3-acetate, which recrystallized from methylene chloride-methanol, shows M.P. 93–95° C.; $[\alpha]_D = 0°$ (dioxane).

Similarly the 17-(1'-methoxy)-cyclopentyl ether of $\Delta^4$-androstene - 3β,17β - diol-3-propionate is prepared, M.P. 103–105° C.; $[\alpha]_D = -3°$ (dioxane).

1 g. of 17-(1'-methoxy)-cyclopentyl ether of $\Delta^4$-androstene-3β,17β-idol-3-acetate, dissolved in 30 cc. of methanol, is heated under reflux for two hours with 0.6 g. sodium carbonate in 5 cc. of water solution. By concentrating the solution to dryness and purifying the residue from methanol, there is obtained 17-(1'-methoxy)-cyclopentyl ether of $\Delta^4$-androstene - 3β,17β - diol, M.P. 152–154° C.; $[\alpha]_D = +36°$ (dioxane).

Example 15

10 g. of $\Delta^4$-androstene-3β,17β-diol-3-acetate, suspended in 50 cc. of anhydrous dioxane, are treated at room temperature with 100 mg. of pyridine tosylate and 5 cc. of cyclohexanone methyl enolether. The suspension is maintained under stirring for about 10 minutes. After standing overnight the precipitate is taken up with methanol and recrystallized from methanol-methylene chloride. The resulting product consists of 17-(1'-methoxy)-cyclohexyl ether of $\Delta^4$-androstene-3β,17β-diol-3-acetate, M.P. 103–105° C.; $[\alpha]_D = 0°$ (dioxane).

In the same manner as above the 17-(1'-methoxy)-cyclohexyl ether of $\Delta^4$-androstene-3β,17β-diol - 3 - propionate, M.P. 106–107° C. is obtained. This latter product (1.5 g.) dissolved in 50 cc. of methanol is treated under reflux for two hours with a solution of 0.5 g. of potassium carbonate in 5 cc. of water. The reaction mixture gives, upon concentration, a residue which, purified from methanol, consists of 17-(1'-methoxy)-cyclohexyl ether of $\Delta^4$-androstene-3β,17β-diol, M.P. 189–191° C.; $[\alpha]_D = +42.5°$ (dioxane).

Example 16

A mixture of 4 g. of $\Delta^1$ - androstene - 3α,17β - diol-3-acetate, 40 cc. of anhydrous dioxane, 50 mg. of pyridine tosylate and 5 cc. of cyclopentanone methyl enolether is treated as described in Example 15 to give 17-(1'-methoxy)-cyclopentyl ether of $\Delta^1$-androstene-3α,17β-diol-3-acetate. Hydrolysis of this product with potassium carbonate provides the 17-(1'-methoxy)-cyclopentyl ether of $\Delta^1$-androstene-3α,17β-diol.

Example 17

Following the procedure of Example 5 as suspension of 5 g. of 5α-androstane-3α,17β-diol-3-acetate in 25 cc. of t. butyl alcohol is treated with 3 cc. of cyclopentanone methyl enolether in the presence of 50 mg. of pyridine p-toluenesulfonate to give 17-(1'-methoxy)-cyclopentyl ether of 5α-androstane-3α,17β-diol-3-acetate, M.P. 161–162.5° C.; [α]$_D$=+15° (dioxane).

This product, saponified according to the procedure described in Example 15, is converted to 17-(1'-methoxy)-cyclopentyl ether of 5α-androstane-3α,17β-diol, M.P. 133–135° C.; [α]$_D$=+11° (dioxane).

*Example 18*

Following the procedure of Example 7, 5α-androstane-3α,17β-diol-3-acetate (4 g.) in solution of 800 cc. of hexane is reacted with acetone dimethyl acetal in the presence of 10 mg. of pyridine tosylate to yield 17-(1'-methyl-1'-methoxy)-ethyl ether of 5α-androstane-3α,17β-diol-3-acetate, M.P. 162–164° C.; [α]$_D$=+20°±1 (dioxane).

*Example 19*

To a solution of 1 g. of 5α-androstane-3β,17β-diol-3-acetate in 5 cc. of t. butyl alcohol there are added 10 mg. of pyridine p-toluenesulfonate and 1 cc. of methyl enolether of cyclohexanone. The resulting mixture is allowed to stand overnight after which the precipitate is taken up with methanol, filtered and recrystallized from methanol-methylene chloride to obtain 17-(1'-methoxy)-cyclopentyl ether of 5α-androstane-3β,17β-diol-3-acetate, M.P. 162–164° C.

By alkaline hydrolysis, as in Example 15, the 3-acetate derivative is converted to 17-(1'-methoxy)-cyclopentyl ether of 5α-androstane-3β,17β-diol, M.P. 162–163° C.; [α]$_D$=+6° (dioxane).

*Example 20*

6 g. of Δ$^4$-androstane-3α,17β-diol-3-acetate in 40 cc. of anhydrous dioxane are treated with 5 cc. of cyclopentanone methyl enolether and 100 mg. of pyridine p-toluenesulfonate as in Example 4 to give 17-(1'-methoxy)-cyclopentyl ether of Δ$^4$-androstene-3α,17β-diol-3-acetate. The product, hydrolyzed with sodium carbonate in methanol solution as in Example 14, yields the corresponding 17-(1'-methoxy)-cyclopentyl ether of Δ$^4$-androstene-3α,17β-diol.

In the same manner, 17-(1'-methoxy)-cyclopentyl ether of Δ$^{1,4}$-androstadiene-3α,17β-diol-3 - acetate is obtained and converted on alkaline hydrolysis to 17-(1'-methoxy)-cyclopentyl ether of Δ$^{1,4}$-androstadiene-3α,17β-diol.

Similarly 17-(1'-methoxy)-cyclohexyl ether of Δ$^{5(6)}$-androstene-3β,17β-diol is prepared by hydrolysis of the corresponding 3-propionate derivative.

*Example 21*

A solution of 20 g. of epiandrosterone p-toluenesulfonate in 130 cc. of cyclopentyl alcohol is heated on a boiling water bath for 60 hours, then the mixture is diluted with ether, washed with a sodium carbonate solution and the organic layer dried and evaporated to dryness. The residue recrystallized several times from methanol, filtered, washed with a little methanol and dried, yields the cyclopentyl ether of androsterone.

To a solution of 3 g. of this product in 60 cc. of tetrahydrofurane there are added 300 mg. of sodium borohydride dissolved in 6 cc. of water. The resulting mixture is maintained overnight at room temperature and under stirring. By diluting the mixture with water, the 3-cyclopentyl ether of 5α-androstane-3α,17β-diol separates off. This product is suspended in 2 cc. of t. butyl alcohol and treated at room temperature with 10 mg. of pyridine p-toluenesulfonate and 1 cc. of cyclohexanone methyl enolether to give 17-(1'-methoxy)-cyclohexyl ether of 5α-androstane-3α,17β-diol-3-cyclopentyl ether.

Similarly 17-(1'-methoxy)-cyclohexyl ether of androstane-3α,17β-diol 3-n. butyl ether and 17-(1'-methoxy)-cyclohexyl ether of androstane-3α,17β-diol-3-isopropyl ether are prepared.

*Example 22*

To 100 cc. of cyclopentanone, 150 cc. of propyl alcohol and 1 g. of p-toluenesulfonic acid there are added, little by little and under stirring, 150 cc. of propyl orthoformate. The resulting mixture is refluxed for about 45 minutes, then cooled and treated with 760 mg. of potassium carbonate to obtain the cyclopentanone di-n. propyl acetal. By treating 2 g. of 5α-androstane-3α,17β-diol-3-propionate in 80 cc. of chloroform and 600 cc. of hexane with 5 mg. of p-toluenesulfonic acid and 3 cc. of cyclopentanone dipropyl acetal as in Example 1, 17-(1'-propoxy)-cyclopentyl ether of 5α-androstane-3α,17β-diol-3-propionate is obtained.

*Example 23*

A mixture of 50 cc. of cyclopentanone, 75 cc. of isopropyl alcohol and 1 g. of p-toluenesulfonic acid is treated, drop by drop and under stirring, with 75 cc. of isopropyl orthoformate. The mixture is heated to reflux and, after cooling, treated with potassium carbonate to obtain the cyclopentanone di-isopropyl acetal. This product is reacted with Δ$^{5(6)}$-androstene-3β,17β-diol-3-isopropyl ether as in Example 1 to give the 17-(1'-isopropoxy)-cyclopentyl ether derivative.

*Example 24*

A solution of 2 g. of testosterone in 600 cc. of hexane is treated with 10 cc. of diethyl ketone dimethyl acetal and 10 g. of pyridine tosylate. After distillation under vacuum and crystallization of the residue from methanol 17-(1'-methoxy-1'-ethyl)-propyl ether of testosterone is obtained. In the same manner are prepared:

17-(1'-methoxy-1'-ethyl)-propyl ether of Δ$^6$-testosterone;
17-(1'-methoxy-1'-ethyl)-propyl ether of Δ$^1$-testosterone;
17-(1'-methoxy-1'-ethyl)-propyl ether of androstanolone.

*Example 25*

3 g. of 19-nor-testosterone dissolved in 100 cc. of chloroform and 800 cc. of hexane are treated with 5 cc. of ethyl propyl ketone dimethyl acetal (obtained by treating 50 cc. of 3-hexanone with 100 cc. of methanol and 100 cc. of methyl orthoformate in the presence of 1 g. of p-toluenesulfonic acid) and 5 mg. of p-toluenesulfonic acid. After distillation under vacuum the residue is purified from methanol to give 17-(1'-methoxy-1'-ethyl)-n. butyl ether of 19-nor-testosterone. Similarly, 17-(1'-methoxy-1'-ethyl)-n. butyl ether of Δ$^{5(10)}$-estrene-17β-ol-3-one and 17-(1'-methoxy-1'-ethyl)-n. butyl ether of Δ$^{5(6)}$-estrene-17β-ol-3-one are obtained.

*Example 26*

62 g. of methyl n. propyl ketone dimethyl acetal are treated with 66 g. of quinoline and 73 g. of phosphoric anhydride on oil bath from 110 to 180° C. The distillate is treated with metallic sodium to destroy the methanol, washed with water, dried over potassium carbonate and rectified to give the methyl enolether of methyl n. propyl ketone.

This product is reacted with androstane-3β,17β-diol-3-acetate in t. butyl alcohol as in Example 13 to give the 17-(1'-methoxy-1'-methyl)-butyl ether derivative.

17-(1'-methoxy-1'-methyl)-butyl ether of Δ$^4$-androstene-3β,17β-diol-3-acetate; 17-(1'-methoxy-1'-methyl)-butyl ether of Δ$^{1,4}$-androstadiene-3β,17β-3-acetate and 17-(1'-methoxy-1'-methyl)-butyl ether of Δ$^{5,6}$-androstene-3β,17β-diol-3-acetate are similarly obtained.

*Example 27*

80 cc. of dipropyl ketone and 120 cc. of methanol are treated with 120 cc. of methyl orthoformate in the presence of 1 g. of p-toluenesulfonic acid, following the procedure of Example 3 to obtain the dipropyl ketone dimethyl acetal. By reacting this compound with 17β-hydroxy androstane in hexane solution and in the presence of pyridine tosylate, there is provided the 17-(1'- methoxy-1'-propyl)-butyl ether derivative. In the same manner are prepared:

17-(1'-methoxy-1'-propyl)-butyl ether of Δ²-androstene-17β-ol;
17-(1'-methoxy-1'-propyl)-butyl ether of Δ³,⁵-androstadiene-17β-ol and
17-(1'-methoxy-1'-propyl)-butyl ether of Δ⁴-19-nor-androstene-17β-ol.

Example 28

By operating according to the technique described in Example 4 the following compounds are prepared:

17-(1'-methoxy)-cyclohexyl ether of estra-5(10)-ene-17β-ol-3-one, M.P. 154–155° C.; [α]_D=+134° (dioxane);
17-(1'-methoxy)-cyclohexyl ether of 19-nor-testosterone, M.P. 155–156° C.; [α]_D=+41° (dioxane);
17-(1'-methoxy)-cyclohexyl ether of estra-5(6)-ene-17β-ol-3-one;
17-(1'-methoxy)-cyclohexyl ether of Δ⁴-androstene-11β,17β-diol-3-one;
17-(1'-methoxy)-cyclohexyl ether of Δ⁴-androstene-17β-ol-3,11-dione.

We claim:
1. A compound selected from the group consisting of compounds of the formula

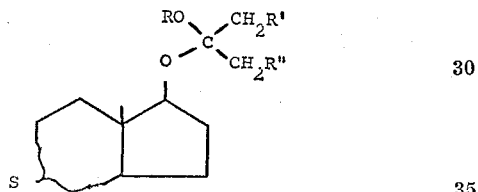

where R is lower alkyl, R' and R'' are each selected from the group consisting of hydrogen, methyl and ethyl and S is a grouping selected from the group consisting of (a) 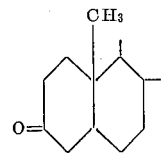

(b) 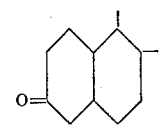

(c) 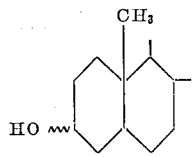

and (d) 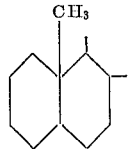

Δ¹-dehydro analogs of compounds having the grouping (a); Δ⁴-dehydro analogs of compounds having the grouping (a); 11β-ol-derivatives of said Δ⁴-dehydro analogs of compounds having the grouping (a); 11-one derivatives of said Δ⁴-dehydro analogs of compounds having the grouping (a); Δ¹,⁴-dehydro analogs of compounds having the grouping (a); Δ⁴,⁶-dehydro analogs of compounds having the grouping (a); Δ⁴-dehydro analogs of compounds having the grouping (b); Δ⁵⁽¹⁰⁾-dehydro analogs of compounds having the grouping (b); Δ⁵⁽⁶⁾-dehydro analogs of compounds having the grouping (b); lower alkyl ethers of compounds having the grouping (c); lower alkanoyl esters of compounds having the grouping (c); Δ¹-dehydro analogs of compounds having the grouping (c); lower alkyl ethers of said Δ¹-dehydro analogs of compounds having the grouping (c); lower alkanoyl esters of said Δ¹-dehydro anlogs of compounds having the grouping (c); Δ⁴-dehydro analogs of compounds having the grouping (c); lower alkyl ethers of said Δ⁴-dehydro analogs of compounds having the grouping (c); lower alkanoyl esters of said Δ⁴-dehydro analogs of compounds having the grouping (c); Δ¹,⁴-dehydro analogs of compounds having the grouping (c); lower alkyl ethers of said Δ¹,⁴-dehydro analogs of compounds having the grouping (c); lower alkanoyl esters of said Δ¹,⁴-dehydro analogs of compounds having the grouping (c); Δ⁵⁽⁶⁾-dehydro analogs of compounds having the grouping (c); lower alkyl ethers of said Δ⁵⁽⁶⁾-dehydro analogs of compounds having the grouping (c); lower alkanoyl esters of said Δ⁵⁽⁶⁾-dehydro analogs of compounds having the grouping (c); Δ²-dehydro analogs of compounds having the grouping (d); Δ⁴-dehydro analogs of compounds having the grouping (d); Δ³,⁵-dehydro analogs of compounds having the grouping (d); and 19-nor-Δ⁴-dehydro analogs of compounds having the grouping (d).

2. A compound selected from the group consisting of compounds of the formula

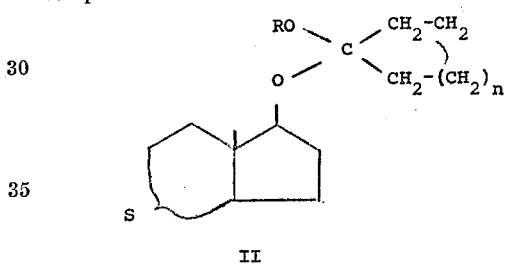

II where R is lower alkyl, n is one of the integers 1 and 2 and S is a grouping selected from the group consisting of (a) 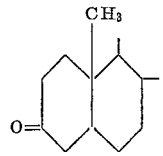

(b) 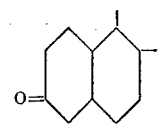

(c) 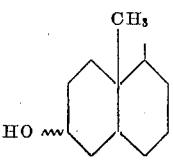

and (d) 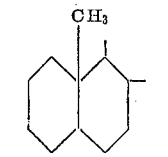

Δ¹-dehydro analogs of compounds having the grouping (a); Δ⁴-dehydro analogs of compounds having the grouping (a); 11β-ol-derivatives of said Δ⁴-dehydro analogs of compounds having the grouping (a); 11-one derivatives of said Δ⁴-dehydro analogs of compounds having the grouping (a); Δ¹,⁴-dehydro analogs of compounds having the grouping (a); Δ⁴,⁶-dehydro analogs of compounds having the grouping (a); $\Delta^4$-dehydro analogs of compounds having the grouping (b); $\Delta^{5(10)}$-dehydro analogs of compounds having the grouping (b); $\Delta^{5(6)}$-dehydro analogs of compounds having the grouping (b); lower alkyl ethers of compounds having the grouping (c); lower alkanoyl esters of compounds having the grouping (c); $\Delta^1$-dehydro analogs of compounds having the grouping (c); lower alkyl ethers of said $\Delta^1$-dehydro analogs of compounds having the grouping (c); lower alkanoyl esters of said $\Delta^1$-dehydro analogs of compounds having the group (c); $\Delta^4$-dehydro analogs of compounds having the grouping (c); lower alkyl ethers of said $\Delta^4$-dehydro analogs of compounds having the grouping (c); lower alkanoyl esters of said $\Delta^4$-dehydro analogs of compounds having the grouping (c); $\Delta^{1,4}$-dehydro analogs of compounds having the grouping (c); lower alkyl ethers of said $\Delta^{1,4}$-dehydro analogs of compounds having the grouping (c); lower alkanoyl esters of said $\Delta^{1,4}$-dehydro analogs of compounds having the grouping (c); $\Delta^{5(6)}$-dehydro analogs of compounds having the grouping (c); lower alkyl ethers of said $\Delta^{5(6)}$-dehydro analogs of compounds having the grouping (c); lower alkanoyl esters of said $\Delta^{5(6)}$-dehydro analogs of compounds having the grouping (c); $\Delta^2$-dehydro analogs of compounds having the grouping (d); $\Delta^4$-dehydro analogs of compounds having the grouping (d); $\Delta^{3,5}$-dehydro analogs of compounds having the grouping (d); and 19-nor-$\Delta^4$-dehydro analogs of compounds having the grouping (d).

3. 17-(1'-methoxy)-cyclohexyl ether of $\Delta^2$-5$\alpha$-androstene-17$\beta$-ol.

4. 17-(1'-methoxy)-cyclohexyl ether of 19-nortestosterone.

5. 17-(1'-methoxy)-cyclopentyl ether of 5$\alpha$-androstane-3$\beta$,17$\beta$-diol 3-acetate.

6. 17(1'-methoxy)-cyclopentyl ether of 5$\alpha$-androstane-17$\beta$-ol-3-one.

7. 17-(1'-methoxy)-cyclopentyl ether of testosterone.

8. 17-(1'-methoxy)-cyclopentyl ether of $\Delta^1$-5$\alpha$-androstene-17$\beta$-ol-3-one.

9. 17-(1'-methoxy)-cyclopentyl ether of $\Delta^4$-androstene-3$\beta$,17$\beta$-diol.

10. 17(1'-methoxy)-cyclopentyl ether of $\Delta^{1,4}$-androstadiene-17$\beta$-ol-3-one.

11. 17-(1'-methoxy)-cyclopentyl ether of $\Delta^4$-androstene 3$\beta$,17$\beta$-diol-3-propionate.

12. 17(1'-ethoxy)-cyclopentyl ether of testosterone.

13. 17-(1'-ethoxy)-cyclohexyl ether of testosterone.

14. 17-(1'-methoxy)-cyclohexyl ether of $\Delta^1$-5$\alpha$-androstene-17$\beta$-ol-3-one.

15. 17-(1'-methoxy)-cyclohexyl ether of $\Delta^1$-5$\alpha$-androstene-3$\beta$,17$\beta$-diol.

16. 17-(1'-methoxy)-cyclohexyl ether of testosterone.

17. 17-(1'-methoxy-1'-methyl)-ethyl ether of 5$\alpha$-androstane-3$\alpha$,17$\beta$-diol-3-acetate.

References Cited by the Examiner
UNITED STATES PATENTS

| | | | |
|---|---|---|---|
| 2,933,514 | 4/1960 | Borrevang | 260—397.4 |
| 3,128,291 | 4/1964 | Borrevang | 260—397.4 |

LEWIS GOTTS, *Primary Examiner.*